Figure 1:
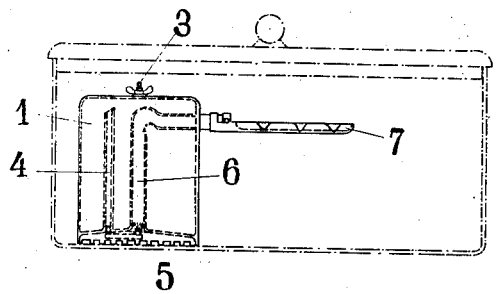

H. SIEGRIST.
APPARATUS FOR AUTOMATICALLY BASTING FRIED OR ROAST MEAT.
APPLICATION FILED APR. 3, 1911.

1,038,217.
Patented Sept. 10, 1912.

Witnesses

Inventor
Hermann Siegrist
By
Attorney

UNITED STATES PATENT OFFICE.

HERMANN SIEGRIST, OF AARAU, SWITZERLAND.

APPARATUS FOR AUTOMATICALLY BASTING FRIED OR ROAST MEAT.

1,038,217.  Specification of Letters Patent.  Patented Sept. 10, 1912.

Application filed April 3, 1911. Serial No. 618,636.

*To all whom it may concern:*

Be it known that I, HERMANN SIEGRIST, a citizen of the Swiss Republic, residing at 75 Metzgerstrasse, Aarau, Switzerland, hotel-keeper, have invented certain new and useful Improvements in Apparatus for Automatically Basting Fried or Roast Meat, of which the following is a specification.

This invention consists in apparatus for automatically basting fried or roast meat.

This device has a vessel for producing steam, provided with a steam injecting nozzle. The steam jet is intended to force the fat in the frying or roasting pan into an uptake tube from which the fat is conveyed into a distributing channel from which it flows over the meat lying in the pan.

Two forms of the invention are illustrated in the drawing.

Figure 2:
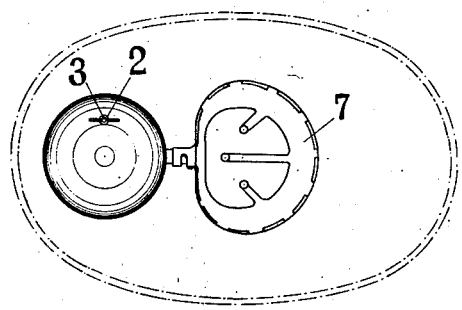
Figure 3:
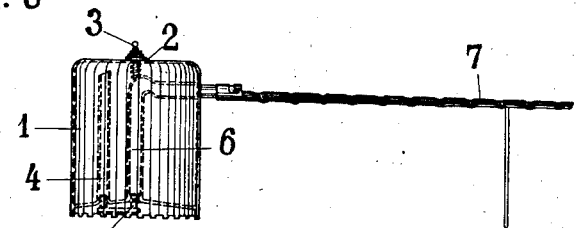
Figure 4:
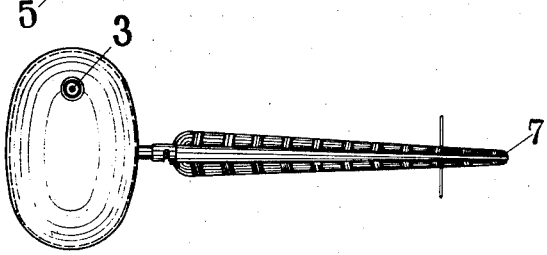

Figure 1 is a vertical section of the device arranged in a roasting or frying pan, and provided with a shell like distributer. Fig. 2 is a plan of Fig. 1. Fig. 3 a vertical section of the device provided with a straight distributing channel. Fig. 4 a plan of Fig. 3.

The vessel 1 containing the water is provided with an opening 2 with a spring seated safety valve. In the vessel 1 a small pipe 4, a steam injector nozzle 5, and an uptake pipe 6 are arranged. The pipe 6 has at its end a flowing and discharging channel 7 and in the case of small apparatus this channel resembles a shell (Figs. 1 and 2) and in large apparatus it is shaped as shown in Figs. 3 and 4.

If the described apparatus be placed in a frying pan or the like with the vessel 1 filled with water, the water in the vessel is evaporated, and the steam flows downward through the pipe 4 to the steam injector nozzle 5 which is directed into the pipe 6. The fat for frying which is already in the frying pan is caused to flow by the oblique position of the frying pan, to the lifting tube and is forced up by the out-flowing steam from the injector 5 into the uptake tube 6, and conveyed into the channel or distributer 7. The lower part of the receptacle 1 is perforated for the purpose of allowing the fat to enter the pipe 6 while preventing meat and other substances from getting into the pipe.

The channel or gutter as shown in Figs. 3 and 4 tapers forward and has side discharging outlets inclined downward.

This apparatus entirely obviates the necessity of basting meat by hand, as the basting fat in the pan is kept in circulation, and is always caused to flow over the meat.

What I claim and desire to secure by Letters Patent is:—

Apparatus for automatically basting meat, comprising a vessel for generating steam, an upwardly directed steam injector nozzle under the bottom of the vessel, a pipe adapted to convey steam from the interior of the vessel to said nozzle, and an uptake pipe above the injector nozzle provided with a distributing device, the whole being adapted to be placed in any ordinary cooking vessel large enough to receive it, and to raise the basting fat which is in the vessel and distribute it over the meat.

In testimony whereof I have affixed my signature, in presence of two witnesses.

HERMANN SIEGRIST.

Witnesses:
 ARTHUR J. BUNDY,
 AUGUST RIEGG.